United States Patent [19]

Kohn

[11] Patent Number: 4,910,082

[45] Date of Patent: Mar. 20, 1990

[54] ULTRATHIN POLYPHENYLENE OXIDE POLYMER FILMS AND THEIR PREPARATION

[75] Inventor: Rachel S. Kohn, Springfield, N.J.

[73] Assignee: Hoechst Celanese Corp., Somerville, N.J.

[21] Appl. No.: 150,163

[22] Filed: Jan. 29, 1988

Related U.S. Application Data

[62] Division of Ser. No. 917,998, Oct. 10, 1986, Pat. No. 4,746,476.

[51] Int. Cl.<sup>4</sup> ................................................ B29C 4/12
[52] U.S. Cl. ...................................... 428/333; 264/41; 264/298; 428/220; 524/465; 524/466
[58] Field of Search .................. 428/220, 433; 264/41, 264/298; 524/465, 466

[56] References Cited

U.S. PATENT DOCUMENTS

| | | | |
|---|---|---|---|
| 3,892,665 | 7/1975 | Steigelmann et al. | 264/41 |
| 4,155,993 | 5/1979 | Salemme et al. | 264/298 |
| 4,279,855 | 7/1981 | Ward, III | 264/298 |

*Primary Examiner*—Allan M. Lieberman
*Attorney, Agent, or Firm*—Lynch, Cox, Gilman & Mahan

[57] ABSTRACT

Disclosed herein are free-standing, pinhole-free, ultrathin, polyphenylene oxide films having thicknesses of about 400 angstroms or less and a process for preparing them. The films find particular utility in separatory applications.

31 Claims, No Drawings

ULTRATHIN POLYPHENYLENE OXIDE POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract Number DAAK 20-84-C-0147 awarded by the Department of Defense (DOD). The Government has certain rights in this invention.

CROSS REFERENCE TO RELATED APPLICATIONS

This is a divisional of application Ser. No. 917,998 filed on Oct. 10, 1986, now U.S. Pat. No. 4,746,476.

BACKGROUND OF INVENTION

1. Field of Invention

This invention relates to polymer films. More particularly, this invention relates to ultrathin, polyphenylene oxide polymer films and their production.

2. Prior Art

The preparation of polyphenylene oxide polymer films on a liquid support, such as water, is known. For example, U.S. Pat. No. 3,551,244 discloses a process for preparing polyphenylene oxide films on a water surface having thicknesses between 0.05 and 5.0 microns (i.e. between 500 and 50,000 angstroms). The patent lists several halogenated solvents, such as chloroform, which can be used for casting polyphenylene oxide films. However, no specific solvent mixtures and ratios suitable for casting ultrathin, pinhole-free, polyphenylene oxide films are disclosed.

In U.S. Pat. Nos. 3,257,358, 3,306,874 and 3,306,875, polyphenylene oxide films are disclosed. However, no film thicknesses are provided.

U.S. Pat. No. 3,933,561 discloses a process for producing polymer films having thicknesses of less than one micron (i.e. 10,000 angstroms), eg. 0.1 micron (i.e. 1,000 angstroms). Polyphenylene oxide is listed as a suitable polymer for the process. The preferred casting surface is water, and the term "water," as used in the patent, includes aqueous solutions containing inorganic acids. However, aqueous ortho-phosphoric acid is not disclosed as a suitable casting surface for pinhole-free, ultrathin, polyphenylene oxide films having thicknesses of 400 angstroms or less nor is a suitable solvent mixture for such films described.

U.S. Pat. Nos. 4,155,793, 4,279,855 and 4,374,891 disclose a process for casting on water substantially void-free, ultrathin, permeable, polymeric membranes having thicknesses of 500 angstroms or less. Films prepared from organopolysiloxane-polycarbonate interpolymers mixed with polyphenylene oxide in a 1:1 ratio by volume of trichloroethylene:trichloropropane are also disclosed. However, unmixed polyphenylene oxide films are not disclosed nor is a suitable casting surface for ultrathin, pinhole-free, polyphenylene oxide films having thicknesses of 400 angstroms or less described.

Other patents, such as U.S. Pat. Nos. 2,631,334, 2,689,187, and 4,393,113, also disclose ultrathin polymeric films. However polyphenylene oxide films are not disclosed.

In the prior art, the preparation of pinhole-free, ultrathin, polyphenylene oxide, free-standing films with thicknesses of less than 400 angstroms generally has not been disclosed. Usually, prior art polymer films with thicknesses of less than 400 angstroms that are cast contain holes or other macroscopic defects.

Accordingly, it is an object of this invention to prepare ultrathin, polyphenylene oxide polymer films.

It is a further object of this invention to prepare pinhole-free, polyphenylene oxide polymeric films.

It is also an object of this invention to prepare free-standing, polyphenylene oxide films having thicknesses of 400 angstroms or less.

These and other objects are obtained by the products and process of the present invention.

SUMMARY OF INVENTION

The instant invention provides a process for preparing pinhole-free, ultrathin, free-standing, polyphenylene oxide films having thicknesses of about 400 angstroms or less. The films are prepared by dissolving a polyphenylene oxide polymer in a suitable mixture of chlorinated solvents to form a polymeric solution, casting the solution on water to form a free-standing film, and removing the film from the water. The ultrathin films of the present invention can be used in separatory applications and as drug release membranes to facilitate the controlled release of drugs.

DETAILED DESCRIPTION OF INVENTION

The preparation of alkyl substituted polyphenylene oxide polymers is well known. Polyphenylene oxides can be prepared by a variety of processes, such as by the thermal decomposition of 3,5-dibromobenzene-1,4-diazooxide, the oxidation of halogenated phenols, Ullman-type condensations, and the refluxing of potassium or silver halogenated phenates in benzophenone. Suitable polyphenylene oxides for use in the present invention and processes for preparing them are disclosed in U.S. Pat. Nos. 3,306,874, 3,306,875, 3,965,069, 3,573,257, 3,257,358, and 3,749,693 and in the articles entitled "Polymerization by Oxidative Coupling," by Hay, et. al, *J. Am. Chem. Soc.*, 81, 6335-36 (1959) and "Polyethers" in *Encyclopedia of Chemical Technology*, 3rd. Ed., Vol. 18, New York: John Wiley and Sons, Inc., pp. 594–605, 1982. Those references are incorporated herein by reference.

The preferred polyphenylene oxide polymers have recurring units of the formula:

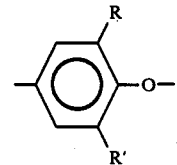

wherein R and R' may be the same or different and are hydrogen atoms, halogen atoms, substituted and unsubstituted hydrocarbon groups, halohydrocarbons, alkoxy groups or phenoxy groups. For example, R and R' can be $CH_3$, $CH_2CH_3$, isopropyl, $CH_3O$, $CH_2C_6H_5$, Cl, and $C_6H_5$. Preferably, R and R' are hydrocarbon groups of from one to eight carbon atoms, including aliphatic, cycloaliphatic and aromatic groups. Most preferably, R and R' are the same.

The most preferred polyphenylene oxide is poly (2,6-dimethyl-1,4-phenylene oxide) which can be prepared by reacting 2,6-dimethyl phenol with oxygen in pyridine in the presence of copper (I) chloride for about 7 minutes at 28° C. to 46° C. Oxygen serves as the oxidizing agent in the reaction. The reaction mixture is then added to methanol, filtered, and washed with methanol to yield the polymer. Suitable poly(2,6-dimethyl-p-phenylene oxide) polymers are available from Polysciences or Scientific Polymer Products, Inc.

The polyphenylene oxide polymers that can be cast as pinhole-free, ultrathin films generally have a molecular weight, $M_w$, greater than about 1000, preferably between about 3,000 and about 60,000, and most preferably between about 18,000 and about 60,000.

The solution from which the films are cast is comprised of the polymer dissolved in a mixture of chlorinated solvents, such as trichloroethylene, 1,2,3-trichloropropane, 1,1,2,2-tetrachloroethane and ortho-dichlorobenzene. A suitable solvent mixture is about a 4:6 to about a 6:4 by volume ratio of trichloroethylene:1,2,3-trichloropropane or trichloroethylene:1,1,2,2-tetrachloroethane, preferably about a 9:11 to about a 11:9 ratio and most preferably about a 1:1 ratio. Another suitable solvent mixture is about a 4:1:1 to about a 2:1:1 by volume ratio of trichloroethylene:1,2,3-trichloropropane:orthodichlorobenzene, and preferably about a 2:1:1 ratio.

In order to prepare a polymer casting solution, the polymer is dissolved in a suitable mixture of solvents as specified above. The casting solution is prepared by stirring the polymer and solvents at a temperature of less than 100° C. (eg. 60° C.) for several hours (e.g. three to seven hours). The casting solution should have about two to about twelve percent by weight of the polymer based upon the total weight of the casting solution, preferably about four to about seven percent by weight of the polymer and most preferably about five percent. Generally, the greater the amount of polymer in the casting solution, the thicker the film will be. Conversely, the lower the amount of polymer, the thinner the film will be. However, if the amount is too low, such as below one percent by weight, the film will be too fragile to lift from the casting surface and will contain defects, such as holes. The polymer solution can be used immediately after preparation or stored in appropriate containers, such as teflon bottles, at room temperature.

It is possible to cast polyphenylene oxide films from a polymer solution containing a polyphenylene oxide polymer and other polymers which are compatible in film form with the polyphenylene oxide polymer and which can be dissolved in the casting solution. When other polymers are mixed with polyphenylene oxide, the amount of polyphenylene oxide employed should be 50 percent or more by weight based upon the total weight of polymers dissolved in the polymeric solution. Examples of these added polymers include polypropylene and high impact polystyrene.

Before the polymeric solution is cast into films, it is preferred to filter the solution using microfilters and/or membranes. Filtration of the polymer solution before casting substantially reduces imperfections in the cast films. For example, the solution can be suction filtered through glass microfiber filters and then passed through a microfiltration membrane having pore with diameters of about 0.45 micron. A suitable membrane is the Durapore 0.45 micron pore size membrane available from the Millipore Corporation. In order to enable the solution to pass through the membrane, it is usually necessary to apply pressure. For example, a Millipore stainless 47 mm pressure holder operated at a pressure up to 100 psi argon can be employed. The amount of pressure applied will depend upon the viscosity of the solution and the pore size of the membrane. Enough pressure to force the solution through the membrane is needed.

After filtration, the solution is cast on an acidic aqueous surface at or near room temperature. The preferred acidic aqueous surface is an aqueous ortho-phosphoric acid solution containing about 60 percent to about 85 percent by weight ortho-phosphoric acid in water, preferably about 60 to about 70 percent, and most preferably about 64 percent. Films cast on less than 60 percent aqueous ortho-phosphoric acid tend to contain holes.

The acidic solution is contained in any suitable container. For example, a watch glass with a 12 inch diameter and a height of one inch from the base to the outer edge can be employed. In addition, an aluminum container having dimensions of $12'' \times 12'' \times 3''$ and teflon coated walls may also be used. The aluminum walls need to be coated to prevent the ortho-phosphoric acid from corroding them. Preferably, the walls of the aluminum container are sloped outwardly at about a 20 degree incline to reduce reflected surface waves which can damage the film. Such waves are produced when the polymeric solution is placed on the phosphoric acid surface or by air currents and external vibrations.

The solution is cast by depositing a drop of the polymer solution by any appropriate means upon the phosphoric acid surface. The solution spreads over the acid's surface in three seconds or less. The solution is allowed to stand until a sufficient amount of the solvent has evaporated to form a free-standing film. As used herein, the term "free-standing film" refers to a film that has a physically stable shape and is dimensionally stable on its casting surface and can be removed from the casting surface without having to be supported over the entire surface area of the film. The time of evaporation generally is between 20 and 30 seconds and rarely more than about 60 seconds.

After the solvent has evaporated, the film is lifted from the liquid surface using any suitable means, such as a $2'' \times 3''$, thin, aluminum plate having a 30 millimeter inner diameter hole in it and a handle on one end of the plate. When the aluminum plate touches the surface of the film, the film adheres to the aluminum plate and may be readily removed from the surface of the acid. After removal of the film, it is preferred to wash the film with water to remove residual acid on the film. After washing, the film is allowed to air dry.

The films of the instant invention are generally round, ultrathin, pinhole-free, uniform films having a diameter of about seven inches and a thickness of 400 angstroms or less and usually about 250 angstroms or less. As used herein, the term "ultrathin film" refers to a film having a thickness of about 400 angstroms or less, and the term "pinhole-free film" refers to a film containing no holes one micron or more in diameter.

The films of this invention can be used as gas separation membranes and in end uses where a controlled release of drugs is needed.

The invention is illustrated by the following examples in which all percentages are by weight unless otherwise specified.

EXAMPLE 1

A polymer solution was prepared containing five percent by weight poly (2,6-dimethyl-1,4-phenylene oxide) dissolved in a 1:1 by volume mixture of trichloroethylene:1,2,3-trichloropropane by magnetically stirring the solvents and the polymer at 60° C. for five hours. The polyphenylene oxide polymer had a density of 1.06 g/cc, a Tg of 211° C., a Tm of 268° C., and was obtained from Scientific Polymer Products, Inc.

After the polymer was dissolved, the polymer solution was filtered through Whatman GF/D glass microfiber filters having a particle retention size of 2.7 microns and available from Fisher Scientific and then passed through a membrane. The membrane was a Durapore polyvinylidene fluoride membrane filter having a pore size of 0.45 micron and was obtained from the Millipore Corporation. A Millipore stainless 47 millimeter pressure holder operated at a pressure sufficient to pass the solution through the membrane was employed.

After filtration, a drop of the polymer solution was deposited on a 64 percent aqueous ortho-phosphoric acid solution. The acid was contained in a watch glass having a diameter of 12 inches and a height of one inch from the base to the outer edge. The drop spread rapidly over the surface of the acid to form a film having a diameter of about seven inches. After 20 seconds, the film was lifted from the surface of the acid using a 2"×3" aluminum plate with a 30 mm diameter hole in the middle and a handle attached at one end. The film was washed with a stream of distilled water to remove the acid on the film's surface and then air dried. The film was uniform, colorless, and had a thickness of about 250 angstroms. Microscopic examination of the film disclosed no pinholes having a diameter of more than one micron.

EXAMPLE 2

Example 1 was repeated except that the film was cast on water instead of ortho-phosphoric acid. The resulting film had many macroscopic holes.

EXAMPLE 3

Example 1 was repeated except that the film was cast on 50 percent aqueous ortho-phosphoric acid. The resulting film contained microscopic holes having diameters of more than one micron.

EXAMPLE 4

Example 1 was repeated except that the film was cast on 85 percent aqueous ortho-phosphoric acid. The resulting film contained no macroscopic pinholes.

EXAMPLE 5

Example 1 was repeated except that a 2:1:1 by volume solvent mixture of trichloroethylene:1,2,3-trichloropropane:orthodichlorobenzene was employed. The resulting film contained no macroscopic holes.

EXAMPLE 6

Example 1 was repeated except that the polymer was dissolved in trichloroethylene alone. The resulting film was quite thick and had a small diameter.

EXAMPLE 7

Example 1 was repeated except that a 1:1 by volume ratio of trichloroethylene:1,1,2,2-tetrachloroethane was employed. The resulting film contained no microscopic pinholes having a diameter greater than one micron.

As can be seen, water alone is not a suitable casting surface for microscopically pinhole-free films, and the amount of ortho-phosphoric acid in the liquid casting surface is critical for preparing pinhole-free films.

What is claimed is:

1. A polyphenylene oxide free-standing polymer film containing no holes about one micron or more in diameter and having a thickness of about 250 angstroms or less and randomly oriented molecules.

2. The film of claim 1 wherein the film is prepared from a polyphenylene oxide polymer having the repeating formula:

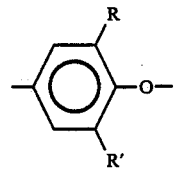

wherein R and R' may be the same or different and are hydrogen atoms, halogen atoms, substituted and unsubstituted hydrocarbon groups, halohydrocarbons, alkoxy groups or phenoxy groups.

3. The film of claim 2 wherein R and R' are hydrocarbon groups of from one to eight carbon atoms.

4. The film of claims 2 or 3 wherein R and R' are the same.

5. The film of claim 1 wherein the film is prepared from poly(2,6-dimethyl-p-phenylene oxide).

6. The film of claims 1, 2, 3 or 5 wherein the film is prepared from a polyphenylene oxide polymer having a molecular weight, $M_w$, greater than about 1,000.

7. The film of claim 6 wherein the molecular weight is in the range of about 3,000 to about 60,000.

8. The film of claim 7 wherein the molecular weight is in the range of about 18,000 to about 60,000.

9. The film of claims 1, 2, 3, or 5 wherein the film is prepared from a casting solution containing a polyphenylene oxide polymer at about the 50 to about the 100 percent by weight level and another polymer or polymers at about the 50 to about the 0 percent by weight level based upon the total weight of polymers in the casting solution.

10. A polyphenylene oxide polymer film containing no holes about one micron or more in diameter and having a thickness of about 400 angstroms or less and randomly oriented molecules prepared according to the process comprising:
 (a) preparing a polymer solution containing a polyphenylene oxide polymer having a molecular weight, Mw, greater than about 1000, at about the two to about the twelve percent level, based on the total weight of the casting solution, in a mixture of chlorinated solvents;
 (b) depositing the polymer solution on about 60 to about 85 percent aqueous ortho-phosphoric acid to form a free-standing film; and
 (c) removing the film from the aqueous ortho-phosphoric acid.

11. A polyphenylene oxide polymer film containing no holes about one micron or more in diameter and having a thickness of about 400 angstroms or less and randomly oriented molecules prepared according to the process comprising:
 (a) preparing a casting solution containing a polyphenylene oxide polymer having a molecular weight, Mw, greater than about 1000, and having repeating units of the general formula:

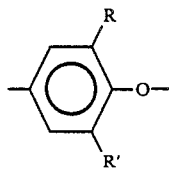

wherein R and R' may be the same or different and are hydrogen atoms, halogen atoms, substituted and unsubstituted hydrocarbon groups, halohydrocarbons, alkoxy groups or phenoxy groups, at about the two to about the twelve percent by weight level, based on the total weight of the casting solution, in about a 4:6 to about a 6:4 by volume ratio of trichloroethylene: 1,2,3-trichloropropane or trichloroethylene:1,1,2,2-tetrachloroethane;

(b) depositing the casting solution or about 60 to about 85 percent aqueous ortho-phosphoric acid to form a free-standing film;

(c) removing the film from the ortho-phosphoric acid.

12. A polyphenylene oxide polymer film containing no holes about one micron or more in diameter and having a thickness of about 400 angstroms or less and randomly oriented molecules prepared according to the process comprising:

(a) preparing a casting solution containing a poly(2,6-dimethyl-p-phenylene oxide) polymer having a molecular weight, Mw, greater than about 1000, at about the two to about the twelve percent by weight level, based upon the total weight of the casting solution, in about a 1:1 by volume ratio of trichloroethylene:1,2,3-trichloropropane or trichloroethylene:1,1,2,2-tetrachloroethane;

(b) depositing the casting solution on about 60 to about 70 percent by weight aqueous ortho-phosphoric acid to form a free-standing film; and (c) removing the film from the ortho-phosphoric acid.

13. The film of claim 11 wherein R and R' are hydrocarbon groups of from one to eight carbon atoms.

14. The film of claim 13 wherein R and R' are the same.

15. The film of claim 10 wherein the chlorinated solvents are selected from trichloroethylene, 1,1,2,2-tetrachloroethane, 1,2,3-trichloropropane and ortho-dichlorobenzene.

16. The film of claim 15 wherein the mixture of chlorinated solvents is about a 4:6 to about a 6:4 by volume ratio of trichloroethylene:1,2,3-trichloropropane or trichloroethylene:1,1,2,2-tetrachloroethane.

17. The film of claim 16 wherein the ratio is about a 9:11 to about a 11:9 by volume ratio.

18. The film of claim 17 wherein the ratio is about a 1:1 by volume ratio.

19. The film of claim 15 wherein the mixture of chlorinated solvents is about a 4:1:1 to about a 2:1:1 by volume ratio of trichloroethylene:1,2,3-trichloropropane:ortho-dichlorobenzene.

20. The film of claim 19 wherein the ratio is about a 2:1:1 by volume ratio.

21. The film of claim 10 or 11 wherein the polymer is a poly(2,6-dimethyl-p-phenylene oxide) polymer.

22. The film of claims 10, 11 or 12 wherein the polyphenylene oxide polymer has a molecular weight in the range of about 3,000 to about 60,000.

23. The film of claim 22 wherein the molecular weight is in the range of about 18,000 to 60,000.

24. The film of claim 10, 11 or 12 wherein the polyphenylene oxide polymer is present at about the four to about the seven percent by weight level in the casting solution based upon the total weight of the casting solution.

25. The film of claim 24 wherein the polymer is present at about the five percent by weight level.

26. The film of claim 11 wherein the casting solution contains about a 9:11 to about a 11:9 by volume ratio of trichloroethylene:1,2,3-trichloroethane or trichloroethylene:1,1,2,2-tetrachloroethane.

27. The film of claim 26 wherein the ratio is about 1:1.

28. The film of claim 10 or 11 wherein the ortho-phosphoric acid is about 60 to about 70 percent aqueous ortho-phosphoric acid.

29. The film of claim 10, 11 or 12 wherein the aqueous ortho-phosphoric acid is about 64 percent aqueous ortho-phosphoric acid.

30. The film of claim 10, 11 or 12 wherein the casting solution contains a polyphenylene oxide polymer at about the 50 to about the 100 percent by weight level and another polymer or polymers at about the 50 to about the 0 percent by weight level based upon the total weight of the polymers dissolved in the casting solution.

31. The film of claim 26 wherein the polymer is a poly(2,6-dimethyl-p-phenylene oxide) polymer.

* * * * *